March 29, 1932.   R. D. NYE   1,851,920
BLOOMING MILL MANIPULATOR
Filed Jan. 5, 1931   6 Sheets-Sheet 3
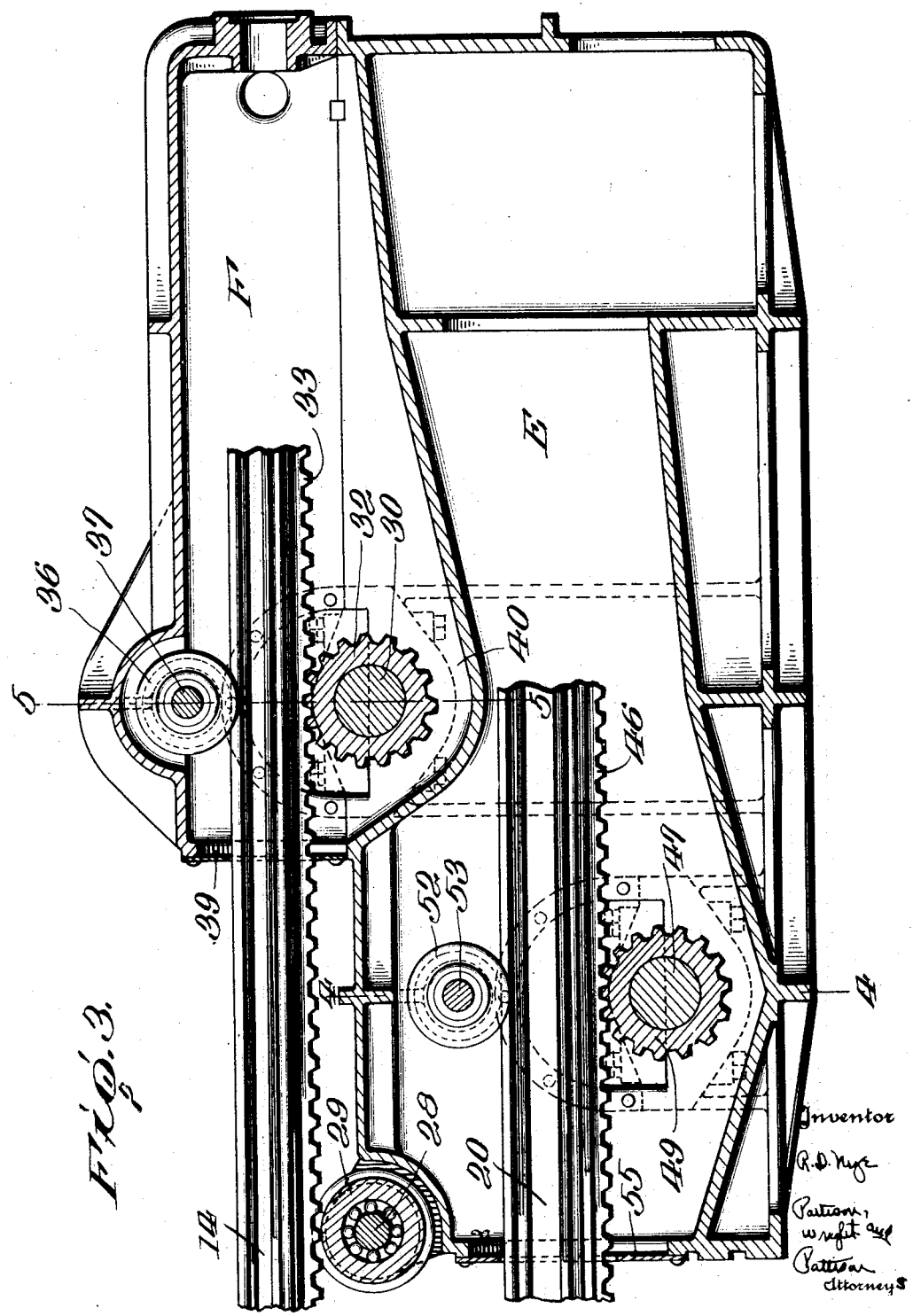

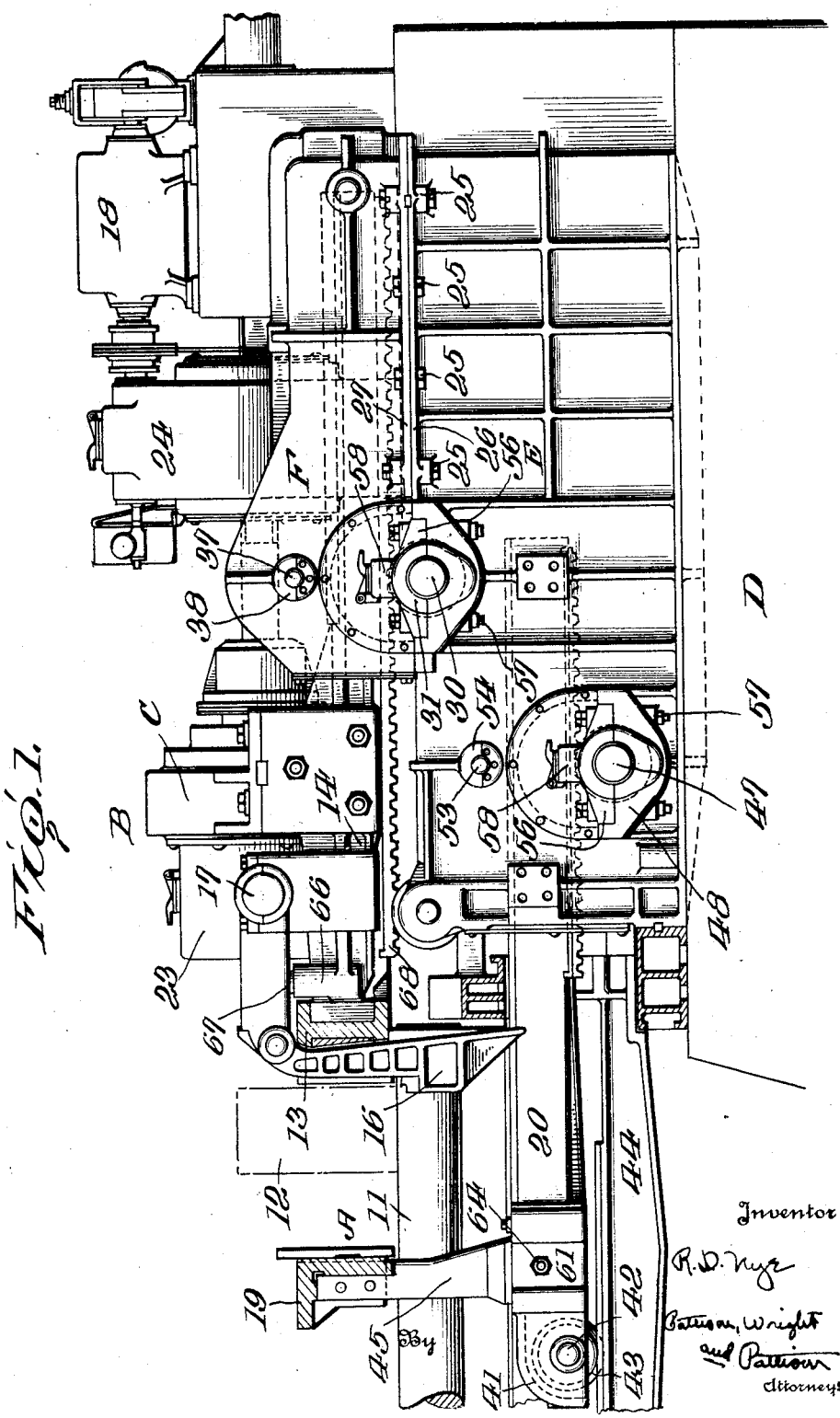

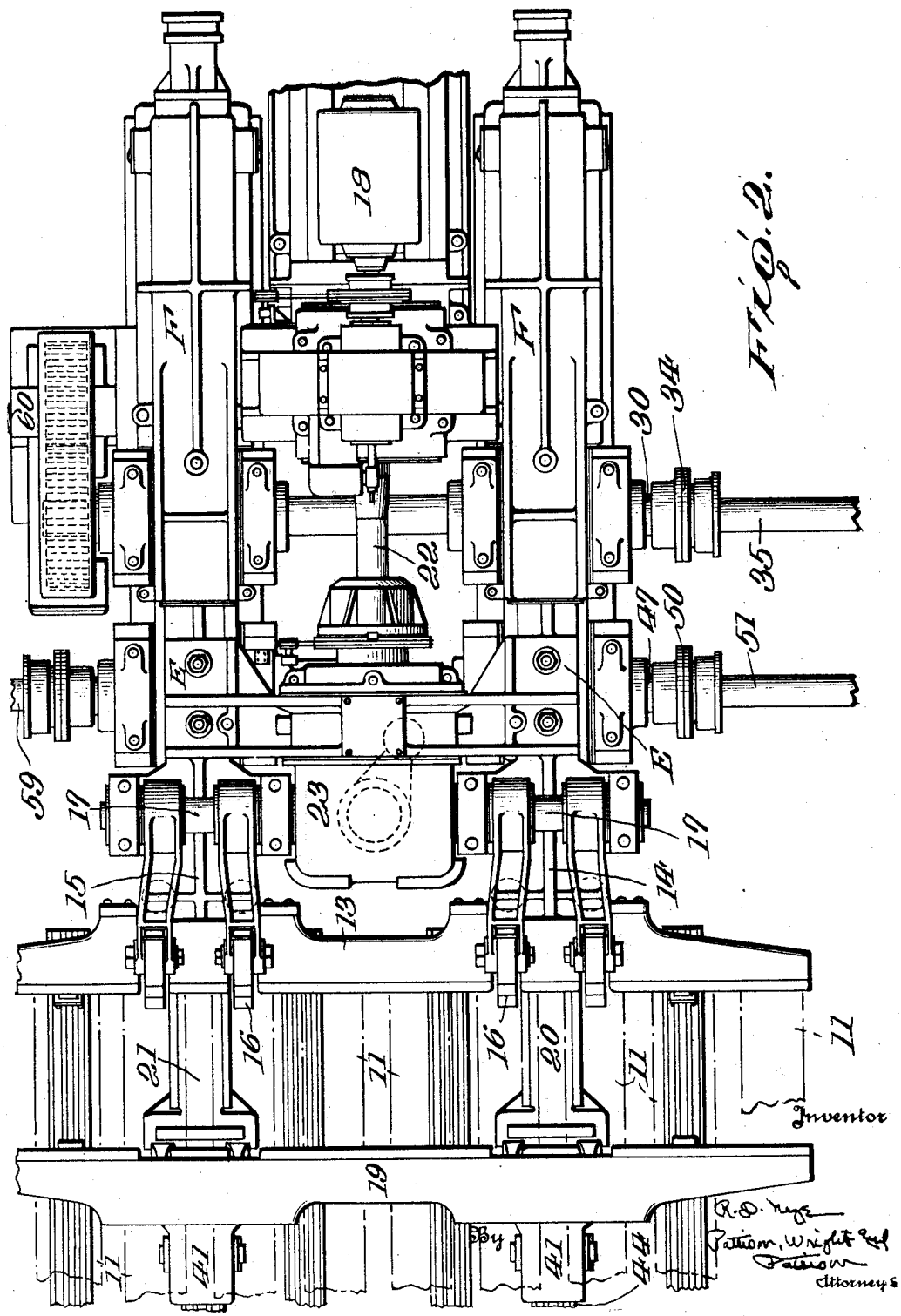

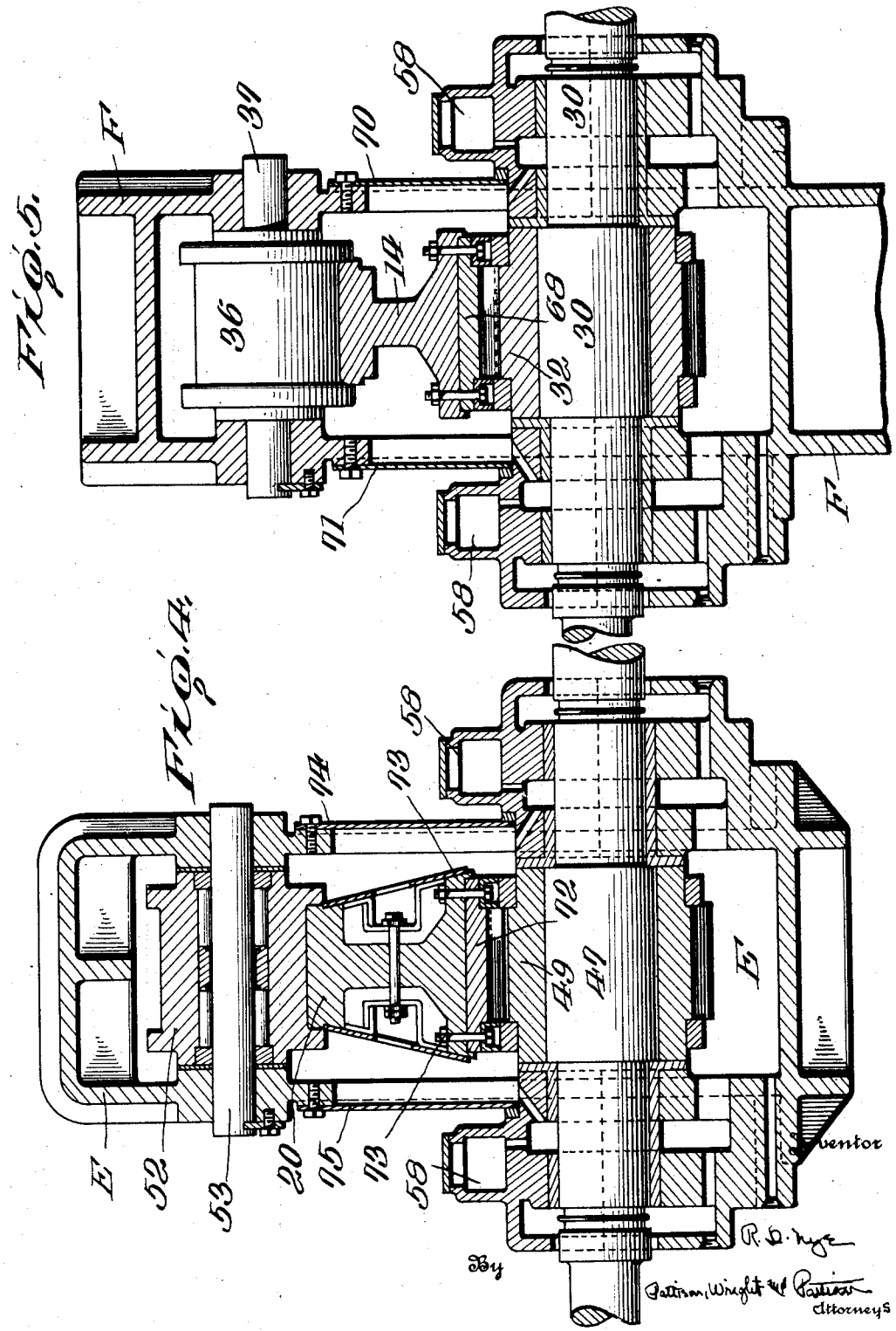

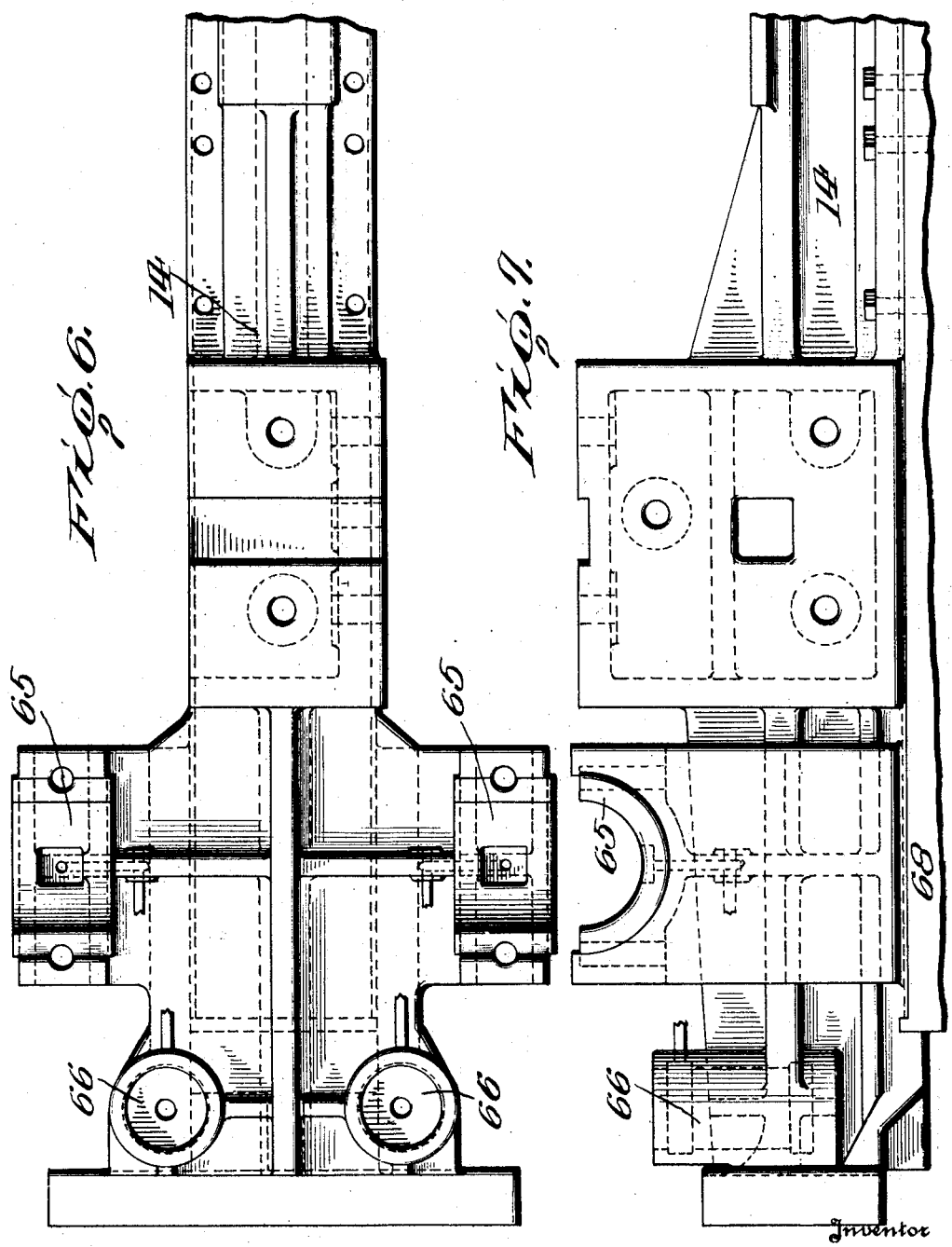

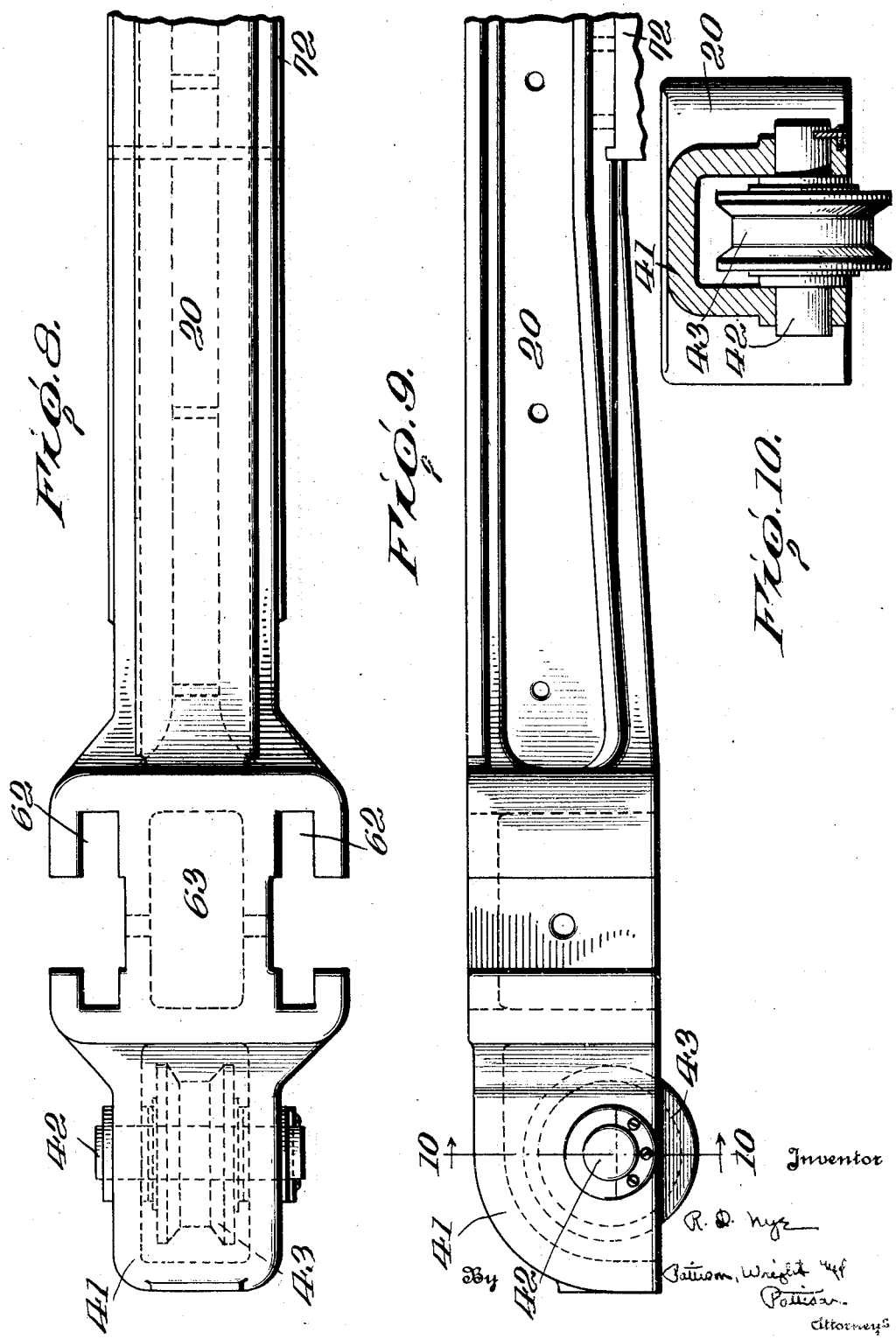

Patented Mar. 29, 1932

1,851,920

UNITED STATES PATENT OFFICE

RALPH D. NYE, OF WHEELING, WEST VIRGINIA, ASSIGNOR TO WHEELING MOLD & FOUNDRY DIVISION OF THE CONTINENTAL ROLL & STEEL FOUNDRY COMPANY, OF WHEELING, WEST VIRGINIA, A CORPORATION OF DELAWARE

BLOOMING MILL MANIPULATOR

Application filed January 5, 1931. Serial No. 506,772.

This invention relates to improvements in blooming mill manipulators or rolling mill manipulators as they are sometimes known and referred to in the industry.

The present invention has been conceived and designated to overcome certain faults and defects in their construction as they are now manufactured, and having in mind the curing of these shortcomings of the present construction of blooming mills the present invention includes the following objects.

The primary object of the invention is the provision of an improved construction of housings for the manipulator racks wherein there are also included the bearings for the rack driving pinions.

A further object of the invention is the positioning in the housings of the bearings for the rack driving pinions in a manner to neutralize or balance stresses to prevent bending or distorting of the rack bars.

Another and further object of the invention is the provision of an improved construction which eliminates foundation bolts for holding the rack pinion bearings in place.

A further object of the invention is that of confining the stresses on the rack driving pinions and their bearings, due to the operation of the racks, to a single casting positioned at each side of the machine.

Other objects, novel features of construction and improved results of the invention will appear from the following description taken in conjunction with the accompanying drawings.

In the drawings:

Figure 1 is a view in side elevation of a rolling mill manipulator built in accordance with the present invention.

Fig. 2 is a top plan view of the manipulator.

Fig. 3 is an enlarged view in vertical section through the improved housing showing therein the ends of the racks, the drive shafts carrying pinions for driving the racks, the bearings for the drive shafts and the rack guide rollers.

Fig. 4 is a vertical sectional view through the lower drive shaft, drive pinion and rack and rack guide roller.

Fig. 5 is a vertical sectional view through the upper power shaft rack and rack guide roller.

Fig. 6 is an enlarged plan view of the outer end of the upper rack bar.

Fig. 7 is an enlarged view in side elevation of the outer end of the upper rack bar.

Fig. 8 is an enlarged plan view of the outer end of the lower rack bar.

Fig. 9 is a view in side elevation of the outer end of the lower rack bar.

Fig. 10 is a transverse vertical section through the lower rack bar, the view being taken on the line 10—10 of Figure 9 looking in the direction indicated by arrows.

In order that the present invention may be more clearly understood a rolling mill manipulator or blooming mill has been illustrated in Figures 1 and 2 of the drawings and a general description and operation of a mill of this kind will be now given.

Referring more particularly to these two figures of the drawings it will be seen that there is provided a work receiving table A made up of a plurality of rollers 11 which receive and progress the work 12 which work may be ingots, pigs, bars, or metal in some other shape or form.

The manipulator which is designated as an entirety by B is positioned at one side of this table and is provided with a side guard 13 which parallels one side of the table. Suitable means is provided in the form of two power driven racks 14 and 15 for reciprocating this side guard over the table. A series of manipulator fingers 16 reciprocate with this side guard and are operated through suitable connection with the shaft 17 which shaft is given a rocking or oscillating motion through suitable connection with a drive motor 18. These fingers are for the purpose of engaging and manipulating the work 12 upon the table.

At the opposite side of the table from the manipulator there is provided a second side guard 19 which guard is also intended to be reciprocated or moved over the table and its driving means is in the form of two power driven rack bars 20 and 21.

Although it does not form any part of the present invention it might be mentioned that the motor 18 imparts to the shaft 22 a rotary motion which rotary motion by reason of a particular construction contained in the housing 23 is converted into a rocking motion to the manipulator finger drive shaft 17. The shaft 22 has a positive connection with suitable drive gears in the housing 24 but this connection is of a form to permit longitudinal movement of this shaft and yet maintain a driving connection between the shaft and the gearing within the housing. A connection of this form is necessary because the drive motor 18 and the gear housing 24 are stationary whereas that portion of the manipulator known as the head which is indicated as an entirety at C and which includes the manipulator finger drive shaft 17 as well as the housing 23 reciprocates with the side guard 13 and the manipulator fingers and is moved through the instrumentality of the upper rack bars 14 and 15.

It is of course necessary to provide a driving means for the two upper and two lower rack bars. This driving means is usually in the form of power shafts extending transverse the manipulator which shafts carry pinions having driving connection with the teeth of the rack bars. In those machines now known to me and in common use these power shafts carrying the drive pinions are mounted in separate bearings which are bolted on to the foundation D of the machines with the result that all stresses must be taken up by the foundation bolts bolting these bearings in place upon the foundation and it has been found that in manipulators constructed in this manner these bearings always work loose and are as a consequence a nuisance causing loss of time in the operation of the machine, cost in maintenance as well as cost in depreciation.

To overcome this weakness in construction found in the ordinary manipulator I have provided at each side of the machine an enlarged and heavy housing made up of a main portion E and a cover portion F. This cover portion extends only throughout a portion of the length of the main housing and is secured firmly thereto by a plurality of bolts 25 which pass through the flanges 26 and 27 respectively of the main housing and the housing cover. The main housings E extend practically throughout the length of the manipulator and are firmly imbedded or secured to the machine base D.

The upper racks 14 and 15 which have driving connection with the manipulator head C for reciprocating this head together with the side guard 13 extend rearwardly into the housing cover F, as clearly appears in Figure 3 of the drawings. The main housings E at their upper front ends carry and support upon stub shafts 28 supporting rollers or gears 29 over which pass the upper rack bars for support at this particular point.

The upper power shaft 30 is supported at each side of the manipulator in suitable bearings 31 which are made as a part of the main housing E and the upper housing cover F so that these shafts are rigidly supported by the housings which receive all of the stresses and strains to which these shafts are subjected.

These power shafts carry adjacent their ends within the housings pinions 32 which engage the rack teeth 33 at the under side of the upper rack bars 14 and 15. By reference to Figure 2 of the drawings it will be seen that the power shafts 30 have their ends extending beyond the housing and are coupled as at 34 to a shaft extension 35 which is connected to some suitable power source, not shown.

To prevent any lifting of the upper racks and to guide the upper racks and keep the teeth thereof in proper driving relation and connection with the drive pinions 32 within the upper housings F are positioned guide rollers 36 supported on stub shafts 37, which shafts are rigidly supported in suitable bearings 38 made as a part of these housings.

To permit access to the upper housings F the front ends thereof are provided with removable plates 39 and the housings are of course of a length to receive or accommodate the upper racks when they are retracted to the full extent of their travel. To give to the upper housing a depth sufficient to accommodate the structure thus far described the upper face of the main housing E is made in the form of a sump 40 which sump, as clearly indicated in Figure 3 of the drawings, forms a goodly portion of the interior of the upper housings F.

The lower racks 20 and 21 at each side of the manipulator are immediately below and in vertical alignment with the upper racks and have in their outer ends a housing 41 within which is rotatably supported upon a shaft 42 a flanged wheel 43 which wheels are intended to run upon the tracks 44 which extend transverse the work table at a point below the same. This construction supports the outer ends of these racks which support is necessary because these lower racks are provided with upwardly extending horns or arms 45 upon the upper ends of which is mounted the table side guard 19. The opposite ends of these lower racks extend into the main housings E as clearly illustrated in Figure 3 of the drawings and upon their lower faces carry rack teeth 46.

For the purpose of driving the lower rack bars there is a transverse power shaft 47 which is supported within suitable bearings 48 made as a part of these main housings and supporting the power shaft at each side of the machine. These power shafts carry drive pinions 49 which have driving connection with the teeth of the rack bars 20 and 21.

As will be seen by reference to Figure 2 of the drawings these power shafts 47 extend outwardly beyond the housings and have suitable connection as at 50 with a drive shaft 51 which leads to some suitable source of motive power, not shown.

Immediately above the driving pinions 49 the main housings carry guide rollers 52 which are rotatably supported upon stub shafts 53, which shafts are supported within bearings 54 formed as a part of these housings. These guide rollers prevent the rear ends of the rack bars from lifting and insure a continuous proper driving connection between the teeth of the rack bars and the driving pinions.

To permit access to the interior of these main housings E the front ends thereof are provided with removable plates 55 and the housings are of course of a length to receive and accommodate the lower racks when the same are retracted to the limit of their extent of travel.

In respect to the bearings for both of the power shafts it will be seen that the upper portions 56 of these bearings are removable, the upper portions being firmly held in place by elongated bolts 57 which bolts are clamped against the lower halves of the bearings.

Lubricant is supplied to these bearings through suitable oil cups or reservoirs 58.

Inasmuch as the side guards 13 and 19 are at times moved simultaneously towards or away from one another it is necessary that the upper and lower power shafts receive their motive power from separate and distinct power units. For the reason that additional side guards are oftentimes provided at a point further along the work receiving table and said side guards are manipulated by a construction such as that just described, the power shafts at one end are provided with extension shafts 59 and 60 which extend to the second set of racks which manipulate the second set of side guards.

By reference to Figure 1 of the drawings it will be seen that there are two horns or arms 45 carried by each lower rack and that the lower ends 61 of these horns extend into the channels 62 provided in the enlarged portion 63 of these lower racks and are secured therein by suitable bolts 64.

Referring to Figures 6 and 7 which are detail views of the upper rack bars 14, it will be seen that adjacent their outer ends these bars carry half bearings 65 which form the lower support or half of the bearings for supporting the manipulator finger drive shaft 17. These racks also carry housings 66 which receive the plunger 67 (see Figure 1) which are the retarders and accelerators for the manipulator fingers.

Figure 7 of the drawings particularly illustrates the manner of attachment to the rack bar of the elongated tooth carrying portion 68 on the under side of the racks, which portion 68 also appear in Figure 5 of the drawings.

Figure 5 of the drawings clearly illustrates the upper power shaft 30 carrying the driving pinion 32 having driving connection with the toothed portion 68 of the upper rack 14. This figure also clearly shows the guide roller 36 mounted upon the stub shaft 37. The respective engagement between the guide roller and the upper face of the upper rack is clearly illustrated and in this figure of the drawings it will be seen that access to the rack and its adjacent construction can be had from either side of the housing by reason of removable plates 70 and 71.

Here it will also appear that oil supply is provided to the power shaft at both sides of its bearing.

Figure 4 clearly illustrates the lower power shaft 47 supported by the main housing E and carrying its driving pinion 49 engaging the toothed portion 72 of the lower rack 20. Here it will be seen that the toothed portion of the rack is a separate member secured to the lower portion of the rack by a plurality of bolts 73. The particular cross sectional configuration of the rack 20 at this point is illustrated as is also the engagement of the upper face of the rack by the guide roller 52. The bearings for the guide roller stub shaft 53 clearly appears as does also the fact that access to the rack and its adjacent construction can be had from either side of the housing by reason of the removable plates 74 and 75. This power shaft is supplied with lubricant at both sides of the housing through suitable oil cups or reservoirs 58.

Having thus described my invention it will be seen that the bearings for the power shafts and the shafts of the guide rollers are made as an integral part of the rack housing castings so that all stresses due to the operation of these racks are confined within these castings. The stresses and strain are material in extent for the reason that a manipulator is a heavily constructed machine of necessity inasmuch as the work which is manipulated upon the table is of considerable weight and size with the result that the strain upon the manipulator fingers and side guards all of which is transmitted back to the racks and the power shafts, is of considerable extent and amount.

Furthermore it will be seen that due to the positioning of the lower racks immediately below the upper racks taken together with the guide rollers above the racks that any bending stresses to the rack bars is taken care of which has not been found to be the case where the rack bars are positioned in separated relation horizontally.

The construction is such that once the bearings are properly set they will remain in that condition notwithstanding unusual stresses and strains to which they are subjected during the operation of the manipulator.

Having thus described my invention what I claim and desire to secure by Letters Patent is:

1. In combination with a pair of side guards at opposite sides of a table and intended to be moved thereover, a reciprocable operating means for said guards, a housing for said reciprocable operating means positioned wholly at one side of said table, power shafts having driving connection with said reciprocable operating means passing through and supported by said housing, power means for said power shafts, and said housing further supporting guide means for said reciprocable operating means, the parts being arranged for the purpose described.

2. In combination with a rolling mill manipulator or the like having a pair of said guards at opposite sides of a work receiving table and intended to be moved thereover, racks for operating the guards, a housing positioned wholly at one side of said table for said racks, said housing supporting power shafts having driving connection with said racks, power means for said power shafts, and said housing further supporting guide means for said racks, the parts being arranged for the purpose described.

3. In a rolling mill manipulator having a pair of side guards intended to be moved over a work receiving table and having racks driven by power shafts for operating said rack, and further characterized by having guide means for said racks, a housing positioned wholly at one side of said table carrying, supporting and receiving the stress of said racks, power shafts and guide means, for the purpose described.

4. In combination with a pair of side guards at opposite sides of a table and intended to be moved thereover, a pair of racks for operating the guards, a housing into which the racks extend, a pair of power shafts in and supported by said housing and having driving connection with said racks, guide rollers for said racks in and supported by said housing, and power means connected to said power shafts, the parts being arranged for the purpose described.

5. In combination with a rolling mill manipulator or the like having a pair of side guards adapted to be moved over a table, a pair of superimposed racks at each side of said manipulator, a housing for said racks, a pair of drive shafts extending across said machine and supported in bearings mounted in said housings, pinions carried by said drive shafts and having driving connection with said racks at one side thereof, guide rollers in said housings at the opposite side of said racks, the lower set of racks having driving connection with one side guard and the upper rack having driving connection with the other side guard, and driving means for said drive shafts, the parts arranged for the purpose described.

6. In combination with a rolling mill manipulator or the like having a pair of side guards at opposite sides of a work receiving table and adapted to be moved thereover, a pair of superimposed racks at each side of said manipulator, a housing at each side of said manipulator comprising a main housing portion and a cap portion the lower of said racks having their one end extending under the table and connected to the side guard at the remote side of the table while their opposite ends extend into the main housing, a power shaft extending transverse said housing and having supporting bearings in the side walls thereof, drive pinions carried by said power shafts and having a driving connection with said racks, guide rollers having shafts supported on bearings in the side walls of said housings, said guide rollers engaging of said racks above said drive pinions, said upper racks attached to the other table side guard and having their one ends extending into the cap housings, a power shaft transverse said cap housings and supported in bearings positioned in the side walls of said main housings and said housings caps, drive pinions carried by said power shaft, supporting rollers for said upper racks rotatably supported in bearings positioned externally of the upper front ends of said main housings, guide rollers for said racks at a point above said drive pinions, and said guide rollers rotatably supported within bearings positioned in the side walls of said cap housings, the parts being arranged for the purpose described.

7. In combination with a rolling mill manipulator or the like having a pair of side guards adapted to be moved over a work receiving table and a manipulator head movable with one of said side guards, means to move said side guards and said manipulator head comprising at each side of the manipulator a pair of racks supported at one end within said housings between drive pinions and guide rollers, said drive pinions carried by power shafts supported within bearings positioned in the side walls of said housings, and said guide rollers rotatably supported upon shafts supported within bearings positioned in the side walls of said housings, the parts being arranged for the purpose described.

8. In combination with a rolling mill manipulator or the like having a pair of side guards adapted to be moved over a work receiving table extending transverse the end of said manipulator and a manipulator head including manipulator fingers movable with one of said side guards, means for actuating said side guards and manipulator head comprising a pair of driven rack bars at each side of said manipulator, one set of rack bars having their outer ends connected with the side guard at the side of the work table remote to the manipulator and carrying in their ends wheels for movably supporting the outer ends of said racks upon tracks extending transverse the work table and below the same, a housing at each side of said manipulator, the inner ends of said racks positioned within said housing and supported and guided between drive pinions and guide rollers, said drive pinions carried by a power shaft extending transverse said housings and supported within bearings positioned in the side walls of said housings, said guide rollers rotatably supported within bearings positioned in the side walls of said housings, the second set of rack bars having driving connection with the other table side guard and the manipulator head, the outer ends of said rack bars carrying bearings for a manipulator finger drive shaft, supporting rollers for said rack bars rotatably supported within bearings positioned in the side walls of said housing at the upper outer end thereof, the inner ends of said rack bars supported within said housings between drive pinions and guide rollers, said guide pinions carried by a second power shaft extending transverse said housings and rotatably supported within bearings positioned in the side walls of said housings, and said guide rollers rotatably supported within bearings positioned in the side walls of said housings, the parts being arranged for the purpose described.

9. In combination with a rolling mill manipulator or the like having a pair of side guards adapted to be moved over a work receiving table, of a pair of racks at each side of said manipulator for actuating said side guards, housings at each side of said manipulator, said housings comprising a main housing portion having in its upper rear end a sump, supplemental cap housings for said main housing positioned above said main housing sumps, a pair of power shafts extending transverse the manipulator and said housings, one power shaft positioned in the main housing and the other power shaft positioner in the cap housing above the sump of the main housing, said power shafts rotatably supported within bearings positioned in the side walls of said main and supplemental housings, drive pinions carried by said power shafts, said rack bars extending into said main housings and said said supplemental housings and having driving connection with said drive pinions, the opposite ends of said rack bars operatively connected with said side guards, guide rollers in both of said housings positioned above said rack bars and above said power shafts, said guide rollers rotatably supported within bearings positioned in the side walls of said housings, and a supporting roller positioned externally of the upper front end of said main housings and rotatably supported within bearings positioned in the side walls of said main housings, the parts being arranged for the purpose described.

10. In combination with a pair of side guards at opposite sides of a table and intended to be moved thereover, a pair of racks for operating the guards, a housing into which the racks extend, a pair of power shafts in and supported by said housing and having driving connection with said racks, and power means connected to said power shafts, the parts arranged for the purpose described.

11. In combination with a pair of side guards at opposite sides of a table and intended to be moved thereover, two pairs of racks for operating the guards, said rack pairs connected to said guards in separated relation in respect to the length of said guards, a pair of housings each of which receive a pair of racks, said housings positioned at one side of said table in separated parallel relation, power shafts passing through and supported by said housings and having driving connection with said racks, and power means connected to said power shafts, the parts being arranged for the purpose described.

In testimony whereof I hereunto affix my signature.

RALPH D. NYE.